United States Patent [19]

Helmbold et al.

[11] Patent Number: 5,506,613
[45] Date of Patent: Apr. 9, 1996

[54] THERMAL PRINT HEAD CONTROL FOR PRINTING SERIAL BAR CODES

[75] Inventors: James E. Helmbold, Centerville; Donald A. Morrison, Dayton; Lorraine T. Porter, Miamisburg; Richard D. Wirrig, Huber Heights, all of Ohio

[73] Assignee: Monarch Marking Systems, Inc., Dayton, Ohio

[21] Appl. No.: 382,881

[22] Filed: Feb. 2, 1995

Related U.S. Application Data

[63] Continuation of Ser. No. 306,371, Feb. 3, 1989, Pat. No. 5,400,058.

[51] Int. Cl.$^6$ .............................. B41J 2/36; B41J 2/365
[52] U.S. Cl. .................................... 347/188; 347/195
[58] Field of Search ............................. 347/195, 188; 400/120.09, 120.1

[56] References Cited

U.S. PATENT DOCUMENTS

| | | |
|---|---|---|
| 4,567,488 | 12/1984 | Moriguchi et al. |
| 4,639,741 | 7/1985 | Inoue . |
| 4,685,069 | 8/1987 | Inui et al. . |
| 4,746,931 | 5/1988 | Okuda . |
| 4,845,514 | 7/1989 | Mitsushima et al. ................... 347/194 |
| 5,400,058 | 3/1995 | Helmbold et al. ...................... 347/195 |

Primary Examiner—Huan H. Tran
Attorney, Agent, or Firm—McAndrews, Held & Malloy, Ltd.

[57] ABSTRACT

A printer for printing serial bar codes on a web of record members with a thermal print head is shown. The thermal print head is driven by a series of pulses having a constant duty cycle for each row of information printed. However, the number of pulses in the series is varied from row to row, in accordance with the status of the current row being printed as a bar row or a space row; with the status of at least one row immediately preceding the current row and at least one row immediately succeeding the current row; and with the number of bar rows previously printed. By varying the number of pulses applied to the thermal print head and thus the amount of energy applied thereto, discontinuities in the serial bar code and any information, such as a human readable character, printed adjacent thereto are minimized.

11 Claims, 3 Drawing Sheets

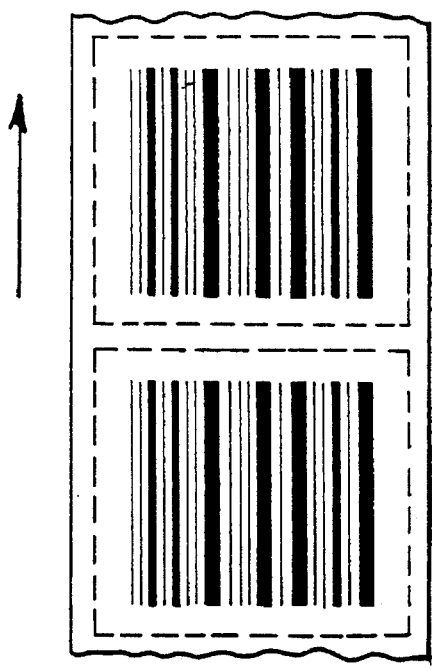
FIG-2-
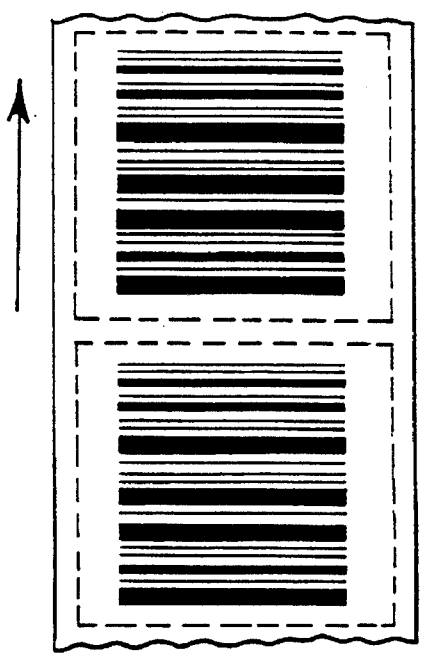
FIG-3-
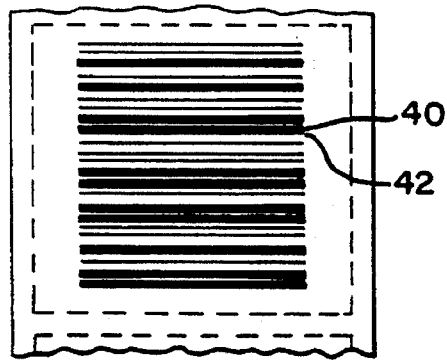
FIG-4-
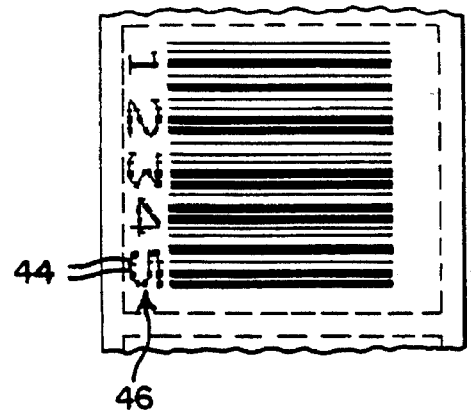
FIG-5-
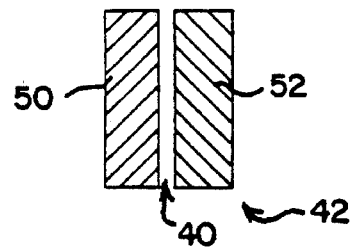
FIG-7A-
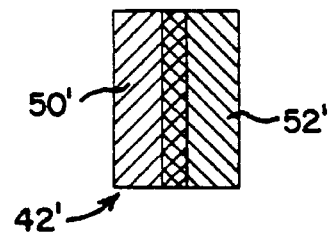
FIG-7B-

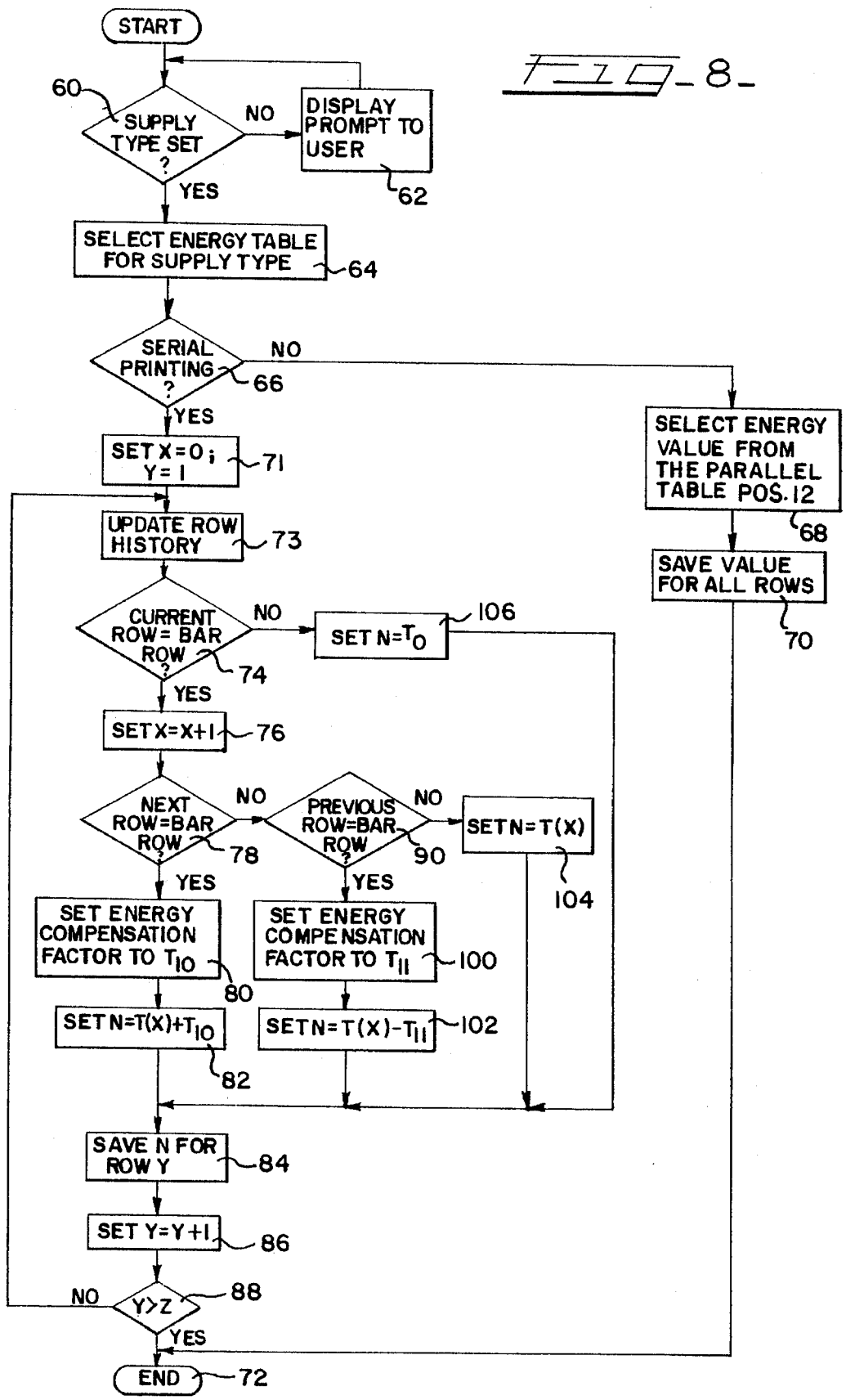
FIG_8_

THERMAL PRINT HEAD CONTROL FOR PRINTING SERIAL BAR CODES

This is a continuation of application Ser. No. 07/306,371 filed Feb. 3, 1989, now U.S. Pat. No. 5,400,058.

TECHNICAL FIELD

The present invention relates to a printer for printing information in rows on a web of record members with a thermal print head wherein the information includes a serial bar code formed of bars and spaces in the information rows and, more particularly, to such a printer having a system for controlling the amount of energy applied to the thermal print head such that the amount of energy varies for each row in accordance with the status of the row as a bar row or a space row; with the status of at least one immediately preceding and one immediately succeeding rows; and with the number of bar rows previously printed in order to eliminate discontinuities in the serial bar code as well as in information, such as human readable characters, printed adjacent thereto.

BACKGROUND OF THE INVENTION

Printers that include a thermal print head for printing information on a web of record members, such as labels, are known. One such type of printer is a thermal direct printer utilizing heat sensitive paper on which printing Is directly carried out by the thermal print head. Such printers have been known to employ a thermal print head having a series of print elements aligned In a row wherein each element produces heat in response to energy applied thereto in order to print a dot. Such print elements may be resistors or the like to which a pulsed signal is applied to drive the print elements to print. In order to control the amount of energy applied to the print elements of a thermal print head, known systems have controlled the width or amplitude of the pulses applied thereto.

In another known system, a fixed number of pulses of a calculated duty cycle are applied to the thermal print head to print each row, wherein the duty cycle is calculated in response to measured, initial values of the thermal print head resistance and temperature as well as the input voltage applied to the thermal print head. In this system, the amount of energy applied to all print elements is made fixed so as to enable the printer to print narrow bars having a width as nominal as possible. This system works well for printing parallel bar codes as shown in FIG. 2 in which the length of the bars forming the code extends parallel to the direction of movement of the stock on which the information is printed. However, this system has several problems in printing serial bar codes in which the length of the bars forming the code extends perpendicular to the direction of movement of the stock as shown in FIG. 3. One such problem is that the serial bar code, and human readable characters if any, appear to be lighter when printed with this system. Further, in printing wide bars which are formed by printing narrow bars side by side, discontinuities such as a gap in the wide bar can result as shown in FIG. 4. These gaps result in wide bars that appear light. When human readable characters are printed adjacent to the serial code as shown in FIG. 5, discontinuities in the characters can result too. Such discontinuities include variations in the darkness of the dots forming portions of a character wherein lighter dots result in those portions of the character that are in a row adjacent to a space of the serial bar code, darker dots resulting in those portions of the character that are in a row adjacent to a bar of the serial bar code, In addition, it has been found that with this system the width of each bar printed increases across the length of the serial bar code or label. As information is being printed, each energized printing element loses heat to the area surrounding the element. This localized, short term temperature increase in the surrounding area results in succeeding information rows starting at a higher temperature than the initial temperature from which the duty cycle is calculated. Because succeeding rows start at a higher temperature, the width of dots printed in each succeeding row increases.

SUMMARY OF THE INVENTION

In accordance with the present invention, the disadvantages of prior printers with thermal print heads in printing serial bar codes, as discussed above, have been overcome. The printer of the present invention includes a system for controlling the amount of energy applied to the thermal print head for printing a serial bar code such that the amount of energy varies for each row in accordance with the status of the row as a bar row or a space row; with the status of at least one immediately preceding and one immediately succeeding rows; and with the number of bar rows previously printed in order to eliminate discontinuities in the serial bar code and in information, such as human readable characters, printed adjacent thereto.

More particularly, the printer of the present invention includes a thermal print head having a number of printing elements aligned in a row for printing a row of information. Means are provided for applying energy to the thermal print head to cause the print elements to print a bar of a serial bar code, and a portion of a human readable character if any, in a row. More particularly, the drive means applies a series of pulses to each print element that is to be on to print in a given row, wherein the duty cycle of the pulses is constant from row to row but the number of pulses in the series is variable. The number of pulses applied to the thermal print head to print each row is determined by a controller to vary the amount of energy applied to the thermal print head.

The amount of energy applied to the thermal print head for a bar row is determined by the number of preceding bar rows printed wherein this amount of energy forms a base value for the bar row. The base value amount of energy is such that it decreases in an approximately exponential manner with increasing number of previously printed bar rows. The base value amount of energy for a bar row is modified by a compensation factor if either the row immediately preceding or the row immediately succeeding is also a bar row. If the row immediately succeeding the current row is also a bar row, the controller increases the base value amount of energy by a first compensation factor. If the row immediately succeeding the current row is a space row but the row immediately preceding the current row is a bar row, the controller decreases the base value amount of energy by a second compensation factor.

The amount of energy applied to the thermal print head for each row determined to be a space row and having a portion of a human readable character therein is fixed at a high level in order to eliminate discontinuities in any portion of a human readable character formed in a row with a space of the serial bar code.

In order to determine whether an information row is a bar row or a space row, the number of print elements to be on for each row is determined and compared to a threshold value. The row is identified as a space row if the number of on print elements is less than the threshold value and the row is identified as a bar row if the number of on elements is greater than or equal to the threshold value. The threshold value may be set equal to the number of elements required to be on to print a bar of the serial bar code, that number defining the height of the bar code. In the preferred embodiment, however, the threshold value is less than the number of elements defining the height of a bar since it has been found that any time a significant number of dots is printed in a row, whether those dots are associated with a bar or a human readable character, a temperature rise results which should be compensated for.

These and other objects, advantages and novel features of the present invention, as well as details of an illustrated embodiment thereof will be more fully understood from the following description and the drawing.

BRIEF DESCRIPTION OF THE DRAWING

FIG. 2 is an illustration of parallel bar codes printed on stock moving in the direction of the arrow;

FIG. 3 is an illustration of serial bar codes printed on stock moving in the direction of the arrow;

FIG. 4 is an illustration of a serial bar code with wide bars having gaps therein;

FIG. 5 is an illustration of a serial bar code with adjacent human readable characters having discontinuities therein;

FIG. 7a illustrates a wide bar having a gap therein;

FIG. 7b illustrates a wide bar formed of overlapping bar rows in accordance with the present invention; and FIG. 8 is a flow chart illustrating the software routine that determines the amount of energy to be applied to the thermal print head shown in FIG. 1.

DESCRIPTION OF THE PREFERRED EMBODIMENT

Figure 1:
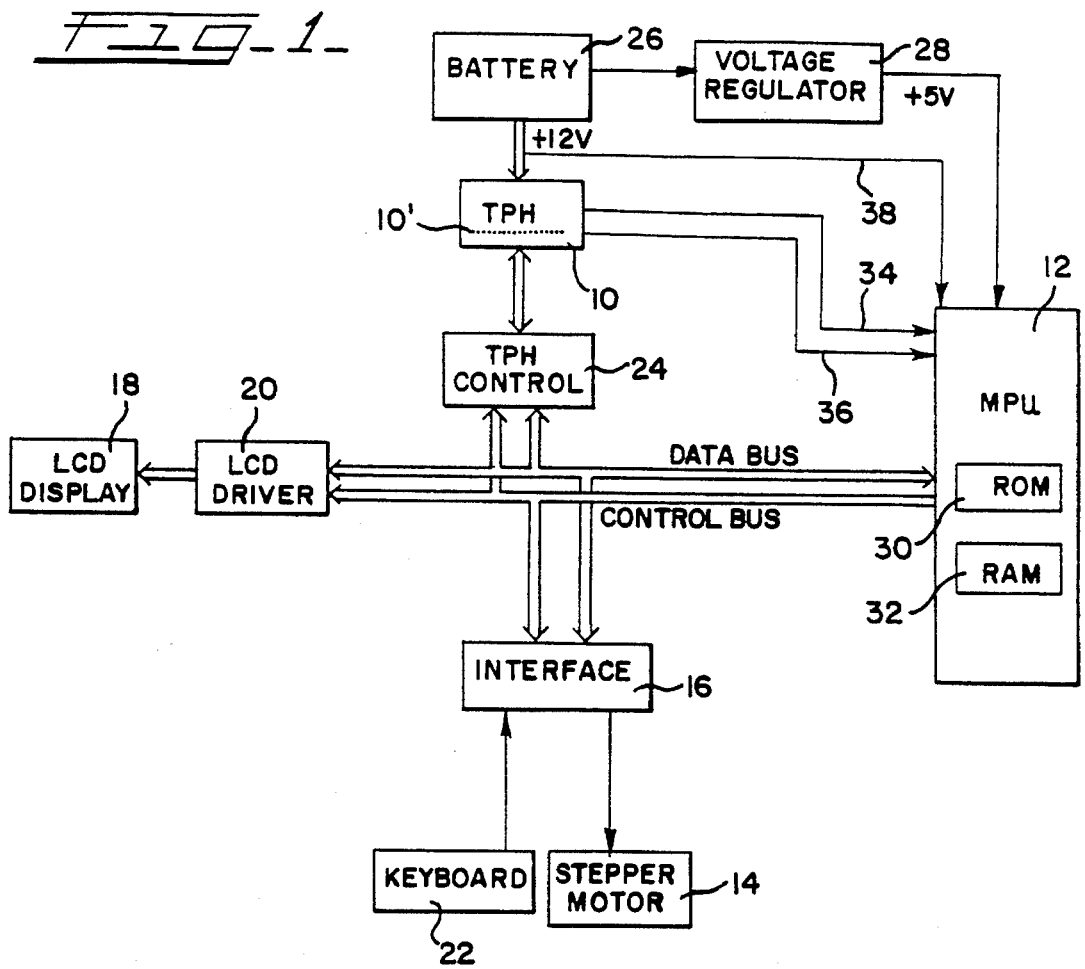
FIG. 1 is a block diagram of the printer of the present invention.

The printer of the present invention is illustrated in the block diagram of FIG. 1 for printing information on a web of record members such as paper stock on which labels are carried. The printer includes a thermal print head 10 having a series of print elements 10' such as resistors or the like that are aligned in a single straight row. When each print element is energized, the print element generates heat in accordance with the amount of energy applied thereto. The heat generated by an energized print element causes a dot to be printed on heat sensitive stock wherein the width of the printed dot increases with increasing temperatures. The stock employed with the thermal print head 10 may be a heat sensitive paper stock or a heat sensitive synthetic label stock each of which requires a different temperature to print a dot of the same width as discussed in detail below. The present invention is equally applicable to non-direct or thermal transfer types of printing also.

The printer of the present invention includes a microprocessor 12 that controls a stepper motor 14 through an interface 16 to move the stock in a direction perpendicular to the line of print elements 10' of the thermal print head 10 to print information on a label. The microprocessor 12 also controls a liquid crystal display, LCD 18 through an LCD driver 20 to display various prompts to a user of the printer.

The user may respond to displayed prompts via a keyboard 22 coupled to the microprocessor 12 through the interface 16. The microprocessor 12 is further coupled to a thermal print head control 24 that is responsive thereto to drive the thermal print head 10, as powered by a battery 26, to print information on a label. The output of the battery 26 is also applied to a voltage regulator 28 that provides +5 volts to the microprocessor 12.

The microprocessor 12 controls the thermal print head control 24, the stepper motor 14 and the LCD display 18 in accordance with software stored in a read only memory, ROM 30. The microprocessor 12 utilizes portions of a random access memory RAM 32 as working registers in which data is manipulated. Another portion of the RAM 32 is utilized to store a bit mapped image of information to be printed on a label wherein each bit identifies whether a particular print element associated therewith should be on or off for a given row of information forming the label. When printing a serial bar code, each row of information may include a bar or a space and a portion of a human readable character, such characters generally spanning a number of rows of information forming the label. To print a row of information, the microprocessor 12 couples a bit mapped image of the row from the RAM 32 to the thermal print head control 24 which responds thereto by applying energy from the battery 26 to the print elements of the thermal print head 10 that are identified as being on for the row. More particularly, the thermal print head control 24 drives the print elements of the thermal print head 10 to print by applying a series of pulses thereto for each row. The duty cycle of the pulses applied to the print elements for each row is calculated from the initial values of the thermal print head resistance and temperature, these values being coupled to the microprocessor 12 on lines 34 and 36 and further in response to the input voltage applied to the thermal print head 10 from the battery 26 as coupled to the microprocessor 12 via line 38. The microprocessor 12 controls the thermal print head control 24 to vary the number of pulses in the series applied to the thermal print head 10 for each row of information to be printed in accordance with the status of the row of information as a bar row or a space row; with the status of the rows immediately preceding and immediately succeeding the row to be printed; and with the number of bar rows previously printed as discussed in detail below with reference to FIG. 8.

Figure 6:
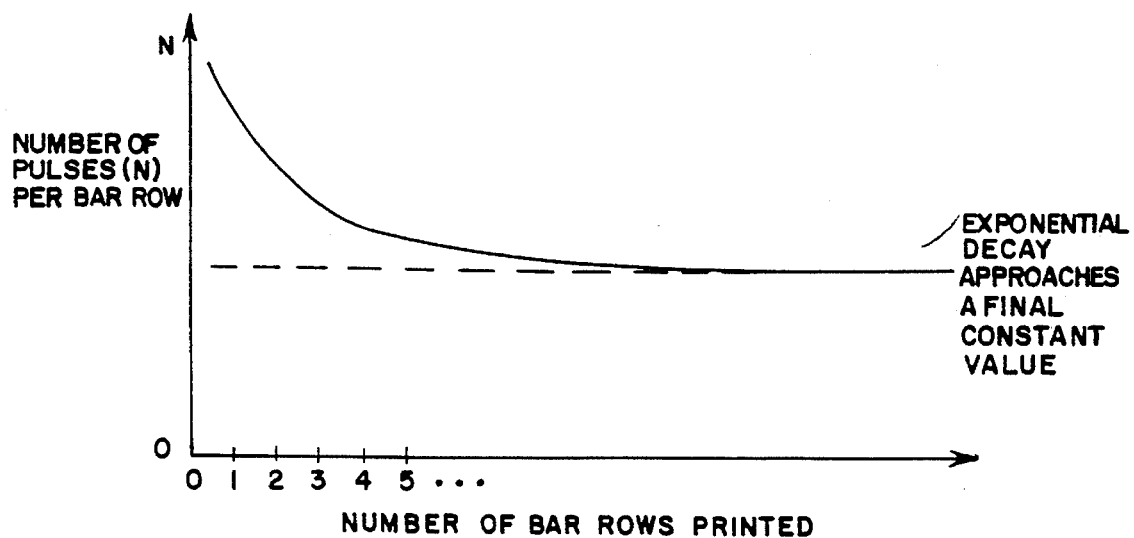
FIG. 6 is a graph illustrating the number of pulses applied to the thermal print head of FIG. 1 to print each bar row as a function of the number of bar rows printed.

The printer shown in FIG. 1, under the control of the microprocessor 12 operating in accordance with the flow chart shown in FIG. 8, may print a parallel bar code as shown in FIG. 2 wherein the length of the bars forming the code extends parallel to the direction of movement of the stock indicated by the arrow. The printer may also print a serial bar code as shown in FIG. 3 in which the length of the bars forming the code extends perpendicular to the direction of movement of the stock indicated by the arrow without the discontinuities depicted in FIG. 4 and FIG. 5 that can result with prior printers. The discontinuities eliminated by the printer of the present invention include gaps 40 in the wide bars 42 and lighter portions 44 in the human readable characters 46 wherein the lighter portions 44 are in the same row as a space 48 of the serial bar code printed adjacent thereto. The printer of the .present invention further insures that the width of each bar row remains substantially constant across the entire length of the bar code or label by decreasing the number of pulses, N, applied to the thermal print head 10 as the number of bar rows printed increases. Since it has been found that the increase in temperature in the area surrounding a print element, when energized, increases exponentially, the number of pulses applied to the thermal print head control for each succeeding bar row printed, decreases in a substantially exponential manner as shown in FIG. 6. To provide the exponentially decreasing number of pulses for each succeeding bar row, the microprocessor 12 utilizes Tables I and II below.

TABLE I

| TABLE POSITION | 0 | 1 | 2 | 3 | 4 | 5 | 6 | 7 | 8 | 9 | 10 | 11 | 12 |
|---|---|---|---|---|---|---|---|---|---|---|---|---|---|
| ROW | SPACE ROW | 1ST BAR ROW | 2ND BAR ROW | 3RD BAR ROW | 4TH–15TH BAR ROWS | 16TH–40TH BAR ROWS | 41ST–70TH BAR ROWS | 71ST 100TH BAR ROWS | 101ST–130TH BAR ROWS | 131ST–UP BAR ROWS | + COMP. FAC- TOR | – COMP. FAC- TOR | PARAL- LEL PRINT- ING |
| A. SYN- THETIC STOCK | 60 | 61 | 59 | 58 | 56 | 54 | 52 | 51 | 50 | 49 | 12 | 9 | 60 |
| B. PAPER STOCK | 56 | 57 | 55 | 54 | 52 | 50 | 48 | 47 | 46 | 45 | 12 | 9 | 56 |

TABLE II

| P | C | S | TABLE I POSITION |
|---|---|---|---|
| 0 | 1 | 1 | 10 |
| 1 | 1 | 1 | 10 |
| 1 | 1 | 0 | 11 |
| 0 | 1 | 0 | NO COMPENSATION FACTOR |

Table I contains the base number of pulses to be applied to the thermal print head for serial bar codes, parallel bar codes or non-bar code characters that are to be printed on either synthetic stock or paper stock. More particularly, for each space row of a serial bar code, the number of pulses applied to each element of the thermal print head 10 when printing on synthetic stock is 60; whereas, the number of pulses applied to the thermal print head 10 when printing on paper stock is 56. These base numbers of pulses for a space row are sufficiently high in value to minimize discontinuities in those portions of a human readable character in the same row as a space of the adjacent serial bar code. The first, second and third bar rows printed for a serial bar code on a label have decreasing base numbers of pulses 61, 59 and 58 for synthetic stock and 57, 55 and 54 for paper stock as shown respectively at positions 1, 2 and 3 in Table I. The fourth through fifteenth bar rows printed for a serial bar code have the same base number of pulses, 56 for synthetic stock and 52 for paper stock, as shown at position 4 in Table I. Similarly, the sixteenth through fortieth bar rows have the same base number of pulses, 54 for synthetic stock and 50 for paper stock, as shown in the fifth position of Table I; the forty-first through seventieth bar rows have the same base number of pulses, 52 for synthetic stock and 48 for paper stock, as shown in the sixth position of Table I; the seventy-first through one-hundredth bar rows have the same base number of pulses, 51 for synthetic stock and 47 for paper stock, as shown in the seventh position of Table I; the one-hundred and first through one-hundred and thirtieth bar rows have the same base number of pulses, 50 for synthetic stock and 46 for paper stock, as shown in the eighth position of Table I; and the one-hundred and thirty-first bar row and each bar row succeeding the one-hundred and thirty-first bar row have the same base number of pulses, 49 for synthetic stock and 45 for paper stock, as shown in the ninth position of Table I. The base number of pulses applied to the thermal print head 10 for a serial bar code may be modified by a positive compensation factor stored at position 10 of Table I to increase the base number or by a negative compensation factor stored at position 11 of Table I to decrease the base number in accordance with the compensation table, Table II as discussed below. The data stored in position 12 of Table I represents the number of pulses to be applied to the thermal print head 10 for each row of a parallel bar code. The data stored in position 12 is also used to print labels with only non-bar code characters in the serial direction.

In Table II, C stands for the status of the current row to be printed; P stands for the status of the row immediately preceding the current row and S stands for the status of the row immediately succeeding the current row. A "0" status identifies the row as a space row; whereas, a "1" status identifies the row as a bar row. The three bits associated with the preceding row, current row and succeeding row are shifted into a working register by the microprocessor 12 and used as the criteria, or as an address to Table I, for selecting a compensation factor to modify the base number of pulses applied to the thermal print head 10 for a current bar row of a serial bar code.

If the current row to be printed is a bar row and the succeeding row to be printed is also a bar row, a compensation factor of 12 is added to the base number of pulses so as to increase the amount of energy applied to the thermal print head in printing adjacent bar rows. This results in overlapping bar rows as shown in FIG. 7B. As shown in FIG. 7A, a wide bar 42 of a serial bar code is formed by printing two or more bars 50 and 52 side by side. Without the present invention, a gap 40 can result in the wide bar 42. The present invention when printing the wide bar 42' shown in FIB. 7B, prevents a gap from being formed therein by first determining the amount of energy to be applied to the thermal print head 10 for the bar 50' in accordance with whether the succeeding row 52' is also a bar row. Since the succeeding row 52' is also a bar, a compensation factor of 12 is added to the base number of pulses determined for the bar row 50'. By increasing the amount of energy applied to the thermal print head, the width of the bar 50' is increased over that shown for the bar 50 of FIG. 7A When printing the bar 52' the microprocessor 12 determines whether the row succeeding the bar row 52' is also a bar row and if it is, the microprocessor 12 again increases the base number calculated for the bar row 52' by a factor of 12. If, however, the row succeeding the bar row 52' is a space row, the microprocessor 12 decreases the base number of pulses by a compensation factor of 9. This is because, the area surrounding the thermal print head elements energized in generating the preceding bar row 50' will still be relatively hot when the bar row 52' is printed and bar row 52' does not need to overlap a succeeding row so full power is not needed.

The microprocessor 12 operates in accordance with the flow chart depicted in FIG. 8 to determine the number of pulses to be applied to each thermal print head element identified to be on by the bit mapped image of the label stored in the RAM 32 for each row of the label as follows. The microprocessor at block 60 first determines whether the type of stock being used is known and if not at block 62 the microprocessor 12 controls the LCD display 18 to display a message to the user prompting the user to enter the type of stock. When the user enters the stock type into the printer via the keyboard 22, the microprocessor 12 proceeds to block 64 to select an energy table for the particular type of stock being used, such as Table IA for synthetic stock or Table IB for paper stock. At block 66 the microprocessor 12 determines whether a serial bar code is to be printed and if not, the microprocessor 12 proceeds to block 68 to select the number of pulses to be applied to the thermal print head 10 for a parallel bar code from position 12 of Table I. At block 70, the microprocessor 12 saves the selected value for all of the rows of the parallel code and proceeds to block 72 to exit the routine. If, however, the microprocessor 12 determines at block 66 that a serial bar code is to be printed, the microprocessor 12 at block 71 initializes the values X and Y to X=0 and Y=1.

At block 73 the microprocessor 12 updates the row history such that three bits in a working register in the RAM 32 accurately represent the status of the preceding row, current row and immediately succeeding row as a bar row or a space row. The microprocessor 12 determines whether a row is a bar row or a space row by counting the number of print elements that are to be on in printing the row as identified in the bit mapped image of the label stored in the RAM 32. The microprocessor 12 then compares the total number of elements to be on to a threshold value and if the number of elements to be on is less than the threshold value, the row is determined to be a space row. If the number of elements to be on is greater than or equal to the threshold value, the row is determined to be a bar row. The threshold value may be set equal to the number of elements that are on for printing each bar of a serial bar code, that number defining the height of the bars of the code. However, in the preferred embodiment, the threshold value is set to some value that is less than the number of print elements defining the height of a bar. This is because any time a significant number, of print elements are energized whether a bar is printed or a human readable character alone, localized heating in the area of the thermal print head 10 occurs and it is this phenomena that the present invention compensates for. It is noted that the status of each row as a bar row or a space row may be determined at the time that the bit mapped image of the label is generated and then stored for use when printing so as to free the microprocessor 12 from performing this task when printing. At block 74, the microprocessor 12 determines from the updated row history whether the current row is a bar row or a space row.

If the current row is a bar row as determined by the microprocessor 12 at block 74, at block 76 the microprocessor 12 sets X=X+1. The microprocessor 12 then determines whether the row immediately succeeding the current row is a bar row or not at block 78. If the immediately succeeding row is a bar row, the microprocessor at block 80 sets the energy compensation factor to T10 and at block 82 sets $N=T(X)+T_{10}$. If, for example, the current row is the sixth bar row to be printed, the microprocessor 12 sets X=6 at block 76 so that T(X)=T(6)=Position 4 which represents a base amount of energy equal to 56 pulses for synthetic stock. Because the next succeeding row is a bar row, the microprocessor sets the energy compensation factor at block 80 to the tenth position in Table I which is equal to 12 so that in the example $N=T(X)+T_{10}=T(6)+T_{10}=56+12=68$. At block 84, the microprocessor 12 saves this value of N for information row Y and at block 86 sets Y=Y+1. The microprocessor then at block 88 determines whether Y is greater than Z, wherein Z represents the number of information rows to be printed for a label. If Y is not greater than Z, the microprocessor returns to block 73 to update the row history so that the amount of energy to be applied to the thermal print head 10 for the next current row may be determined.

If the microprocessor 12 determines at block 74 that the current row is a bar row but determines at block 78 that the immediately succeeding row is a space row at block 78, the microprocessor proceeds to block 90 to determine whether the row immediately preceding the current row was a bar row. If the immediately preceding row was a bar row, the microprocessor at block 100 sets the energy compensation factor to the value stored at the eleventh position in Table I, i.e., 9. The microprocessor 12 then sets $N=T(X)-T_{11}$ at block 102. If the current row again is the sixth row, $N=T(6)-T_{11}=56-9=47$. From block 102 the microprocessor proceeds to block 84 to save this value of N for row Y.

If the microprocessor 12 at block 74 determines that the current row is a space row, the microprocessor 12 proceeds to block 106 to set N equal to the value stored at position zero in Table I, this value being 60 for synthetic stock and 56 for paper stock. Thereafter, the microprocessor 12 proceeds to block 84.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A bar code printer comprising:
    a motor for driving a web of record members in a direction of movement through said printer for printing on said record members;
    a thermal print head having a plurality of print elements for printing information in rows on said record members, said information including a serial bar code having a bar or a space formed in each of said rows, each information row and bar extending perpendicular to the direction of movement of said web;
    means for applying energy to said thermal print head to drive said thermal print head to print;
    means for determining the number of print elements to be turned on to print an information row on a record member;
    means for comparing to a reference value the number of print elements to be turned on to print an information row to identify each information row as a bar row or a space row; and
    means for controlling said energy applying means to apply a constant amount of energy to print information in each information row identified as a space row and to apply an amount of energy to print a bar row that varies in accordance with the number of bar rows previously printed.

2. A bar code printer as recited in claim 1 wherein said reference value is equal to the number of print elements turned on to print each bar of a serial bar code.

3. A bar code printer as recited in claim 1 wherein said reference value is less than the number of print elements turned on to print each bar of a serial bar code.

4. A bar code printer as recited in claim 1 including means for storing data representing the identity of a plurality of information rows as a bar row or a space row, said data being stored for the current information row, at least one information row preceding said current row and at least one information row succeeding said current row and said control means modifying said amount of energy to be applied for a current bar row in accordance with said data stored for said current, preceding and succeeding information rows.

5. A bar code printer comprising:

a motor for driving a web of record members in a direction of movement through said printer for printing on said record members;

a thermal print head having a plurality of print elements for printing information in rows on said record members, said information including a parallel bar code having bars extending parallel to the direction of movement of said web and perpendicular to said information rows or a serial bar code having bars extending perpendicular to the direction of movement of said web and in the same direction as said information rows;

means for applying energy to said thermal print head to drive said thermal print head to print;

means for determining whether a parallel bar code or a serial bar code is to be printed;

means for identifying each information row of a serial bar code as a bar row or a space row; and means for controlling said energy applying means to apply an amount of energy to print each information row of a parallel bar code such that said amount of energy does not vary from information row to information row of said parallel bar code and to apply a nonconstant amount of energy to print the information rows of a serial bar code identified as bar rows.

6. A bar code printer as recited in claim 5 wherein said means for identifying each information row of a serial bar code as a bar row or a space row includes means for determining the number of print elements to be turned on to print an information row on a record member; and means for comparing to a reference value the number of print elements to be turned on to print an information row to identify each information row as a bar row or a space row.

7. A bar code printer as recited in claim 6 wherein said reference value is equal to the number of print elements turned on to print each bar of a serial bar code.

8. A bar code printer as recited in claim 6 wherein said reference value is less than the number of print elements turned on to print each bar of a serial bar code.

9. A bar code printer as recited in claim 5 wherein said control means varies the amount of energy to print a bar row of a serial bar code in accordance with the number of bar rows previously printed.

10. A bar code printer as recited in claim 9 including means for storing data representing the identity of a plurality of information rows as a bar row or a space row said data being stored for the current information row, at least one information row preceding said current row and at least one information row succeeding said current row and said control means modifying said amount of energy to be applied for a current bar row in accordance said data stored for said current, preceding and succeeding information rows.

11. A bar code printer comprising:

a motor for driving a web of record members in a direction of movement through said printer for printing on said record members;

a thermal print head having a plurality of print elements for printing information in rows on said record members, said information including a serial bar code having a bar or a space formed in each of said rows, each information row and bar extending perpendicular to the direction of movement of said web;

means for applying energy to said thermal print head to drive said thermal print head to print;

means for determining the number of print elements to be turned on to print an information row on a record member;

means for comparing to a reference value the number of print elements to be turned on to print an information row to identify each information row as a bar row or a space row;

means for storing data for a plurality of information rows, said data stored for each row representing the identity of the row as a bar row or a space row; and means for controlling said energy applying means to apply an amount of energy to print a bar row that varies in accordance with the number of bar rows previously printed and that varies with said data stored for a plurality of information rows.

* * * * *